United States Patent [19]
Roesgen et al.

[11] Patent Number: 5,332,018
[45] Date of Patent: Jul. 26, 1994

[54] FOLDED BELT REINFORCING ASSEMBLY INCLUDING SPIRALLY WOUND STRIP FOR A PNEUMATIC TIRE

[75] Inventors: Alain Roesgen, Grevenknapp; Pierre Kummer, Bereldange, both of Luxembourg

[73] Assignee: The Goodyear Tire & Rubber Company, Akron, Ohio

[21] Appl. No.: 401,709

[22] Filed: Sep. 1, 1989

[51] Int. Cl.$^5$ ............................................. B60C 9/26
[52] U.S. Cl. ................................. 152/528; 152/531; 152/533
[58] Field of Search .............. 152/526, 528, 527, 530, 152/531, 532, 533, 535, 536, 538

[56] References Cited

U.S. PATENT DOCUMENTS

| | | | |
|---|---|---|---|
| 3,850,219 | 11/1974 | Snyder | 152/531 |
| 4,146,415 | 3/1979 | Caretta et al. | 152/533 |
| 4,183,389 | 1/1980 | Grosch | 152/531 |
| 4,184,529 | 1/1980 | Boileau | 152/529 |
| 4,284,117 | 8/1981 | Poque et al. | 152/538 |
| 4,869,307 | 9/1989 | Bormann et al. | 152/533 |

FOREIGN PATENT DOCUMENTS

| | | | |
|---|---|---|---|
| 0057656 | 12/1984 | European Pat. Off. | 152/533 |
| 258822 | 3/1988 | European Pat. Off. | 152/531 |
| 2193173 | 1/1988 | United Kingdom | 152/529 |

*Primary Examiner*—Geoffrey L. Knable
*Attorney, Agent, or Firm*—David E. Wheeler

[57] ABSTRACT

A radial ply tire (10) has a belt assembly (21) of at least two belt plies (22, 23). At least one of the belt plies has at least one folded portion (24, 25), such that there is at least one folded portion of a belt ply on each lateral side of the belt assembly. A spirally wound strip (26) of a cord reinforced elastomer extends transversely between the folded portions (24, 25).

1 Claim, 3 Drawing Sheets

FOLDED BELT REINFORCING ASSEMBLY INCLUDING SPIRALLY WOUND STRIP FOR A PNEUMATIC TIRE

The present invention relates to a pneumatic tire comprising a radial ply carcass, a tread disposed radially outwardly of the crown region of the carcass, a belt assembly interposed between the tread portion and the crown region of the carcass in circumferential surrounding relation to the carcass, whereby the belt assembly includes at least two plies, each of which comprises cords of high modulus material extending parallel to one another in each belt ply, and making opposed angles with respect to the equatorial plane of the tire. The belt assembly has an overall width at least equal to that of the tread and on each of its lateral sides there is a folded back portion, in a radially outward direction, of one of the plies. Tires comprising such reinforcements in their crown region have been found to be particularly durable when subjected to high revolution speeds.

This high-speed durability has been further improved in the prior art by providing an overlay ply which is interposed between the radially outermost belt ply and the tread and consists of a single belt ply having a width which is about equal to that of the widest of the belt plies.

It has also been proposed in the prior art to use overlay plies comprising several circumferentially spaced overlapping sections, thereby allowing the stresses in the cords to be taken up by the overlap portions which are spaced around the circumference of the tire (see e.g. DE-A-28 24 357 and DE-A-28 21 093).

From U.S. Pat. No. 4,284,117 it is known to use single yarn reinforcing cords for the overlay ply and to wrap more than one turn of this ply around the circumference of the tire thereby greatly reducing the possibility of any slippage of the overlay ply in the final tire. Since the belt ply itself cannot accommodate the expansion of the belt through slippage, the expansion is entirely taken up by the reinforcing yarns which to this effect have a relatively low modulus of elongation as compared to the cords used in single layer overlay plies.

It has been disclosed in British patent specification No 1 590 730 to place two strips of elastomeric material at the side edges of the breaker layers. In each strip polyamide cords are arranged parallel to each other and to the side edges of the strip itself, so that on the carcass, the cords are essentially parallel to the equatorial plane. The central portion consists of a strip having a length slightly greater than the carcass development, so that its ends overlap; as an alternative, the central portion can consist of a single polyamide cord wound around the breaker layers so that its cords are arranged parallel to the equatorial plane in order to cover the entire central portion.

There is provided in accordance with the present invention a pneumatic tire which is durable at high speeds and which at the same time has a high degree of uniformity.

The present invention is characterized in that a spirally wound strip, made from cord reinforced elastomeric material, is located in the proximity of the belt plies and extends at least transversely between the free edges of the folded back portions of the belt ply(ies) and in that the spiral convolutions of the strip make an angle of between 0° and 5° with the equatorial plane of the tire.

A tire according to the instant invention has low ply steer (ply steer is a force component which changes direction with reverse rotation, when measuring the tire lateral force variations), excellent handling characteristics and a uniform tread wear when operated at high speed.

To acquaint persons skilled in the art most closely related to the instant invention, certain preferred embodiments thereof are now described with reference to the annexed drawings.

These embodiments are illustrative and can be modified in numerous ways within the spirit and scope of the invention defined in the claims herebelow.

Figure 1:
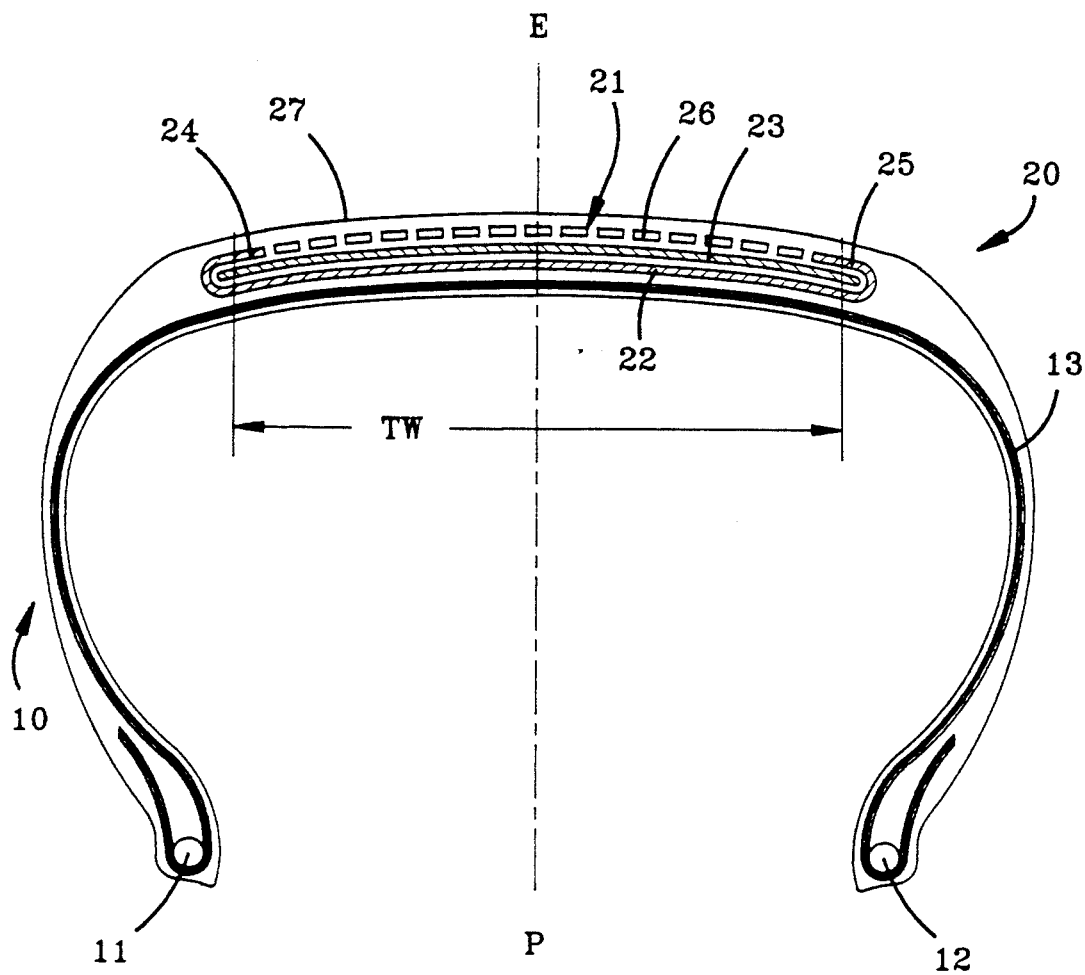
FIG. 1 is a cross-sectional view of a pneumatic tire made in accordance with the present invention.

With reference to FIG. 1, there is represented a radial carcass pneumatic tire 10 having a pair of substantially inextensible bead cores 11, 12 which are axially spaced apart with a radial carcass ply 13 extending between the bead cores. The carcass ply is folded axially and radially outwardly about each of the bead cores and is reinforced by cords which are substantially parallel to each other and make an angle of about 65° to 90° with the equatorial plane (EP) of the tire. The cords of the carcass ply 13 can be made of any suitable material, for example steel, rayon, polyester, polyamide or aromatic polyamide.

As used herein and in the claims, the "equatorial plane" of the tire is a plane that is perpendicular to the axis of rotation of the tire and passes through the center of the tire tread, the terms "axial" and "axially" refer to directions which are parallel to the axis of rotation of the tire and the terms "radial" and "radially" refer to directions that are radially toward or away from the axis of rotation of the tire.

Figure 2:
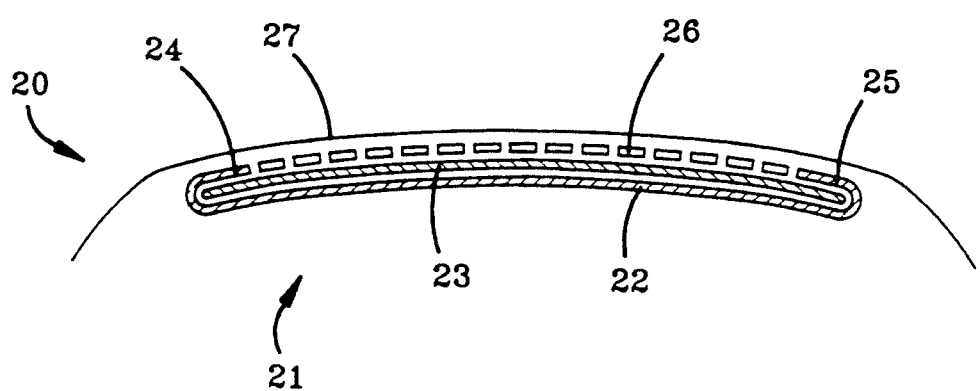
FIG. 2 is an enlarged view of the crown reinforcement of the tire shown in FIG. 1.

As can be more clearly distinguished in FIG. 2, the crown area 20 of the tire 10 is reinforced by a belt assembly 21 located radially inwardly of the tire tread 27. The belt assembly is essentially rigid and comprises two concentric belts 22 and 23, each of which comprises an elastomeric belt ply reinforced by aromatic polyamide cords or other suitable material, as for example steel, glassfiber, carbon-fiber or nylon. Within each belt ply, the cords are substantially parallel to each other, but they make with the cords in the other belt ply opposed angles with respect to the equatorial plane of the tire. The cords of the radially innermost belt ply 22 make e.g. an angle of between 15° to 30° with the equatorial plane (EP) of the tire, whereas the cords of the radially outermost belt ply 23 extend in the diagonally opposite direction to the cords of the radially innermost belt ply i.e. they make an angle of between −15° to −30° with the equatorial plane (EP) of the tire.

The radially innermost belt ply 22 is folded back on both lateral sides in a radially outward direction, the folded back portions 24 and 25 being preferably symmetrical with respect to the equatorial plane. The folded back portions may each have a transverse width up to 30% of the tread width TW, such that they are respectively folded around the lateral edges of the radially outermost belt ply 23.

A spirally wound strip 26 is superimposed radially outwardly of the belt ply 23 and extends transversely between the free edges of the folded back portions 24 and 25 of the radially innermost belt ply. The spirally wound strip is made from elastomeric material reinforced by heat shrinkable cord such as nylon. A typical cord comprises 2 yarns of 840 denier nylon. Other materials such as rayon or polyester could be used. The spiral convolutions of the strip make an angle of between 0°–5° with the equatorial plane (EP) and are in abutment with any adjacent convolution, so as to form a continuous annular ring having a substantially even cord distribution across the axial width of the breaker assembly. The strip has a thickness of about 1 mm and a width in the range of between 10 and 40 mm, and more preferably in the range of 20 to 35 mm and a cord distribution density of at least 12 EPI (ends per inch) and more preferably in the range of 25 to 35 EPI.

Although the reinforcement shown in FIG. 2 has only one annular layer it could be equally provided with a second layer (not shown) located adjacent to and radially outwardly of the first annular layer. Preferably, the second layer has its spiral convolutions wound so that the cords of the second layer cross the cords of the first layer at a very small angle. With such a construction the two layers can be wound continuously in succession without a break in the ribbon.

Figure 3:
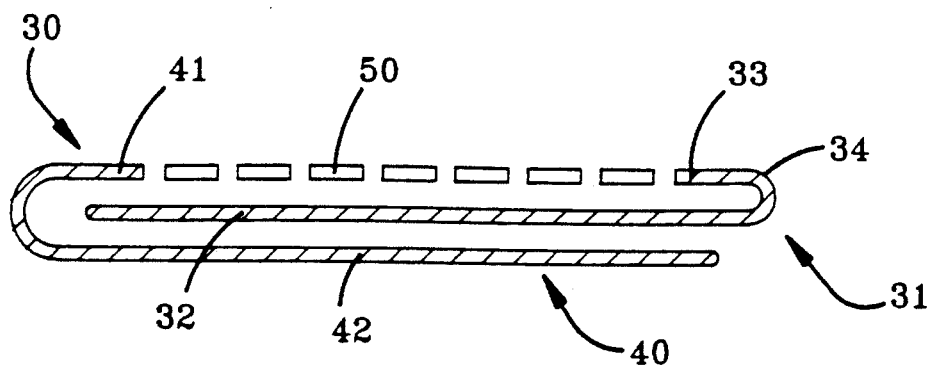
FIGS. 3 to 9 are schematic representations of alternative embodiments of crown reinforcing structures according to the present invention.

Referring to FIG. 3, there is illustrated a belt structure 30 comprising a first folded belt ply 31, which extends circumferentially around the tire. Folded ply 31 comprises a main body portion 32 and a folded end portion 33 which is folded radially outwardly of the main body portion 32 forming bight 34. The width of the folded end portion 33 lies in the range of 1/5 to ⅓ of the width of the main body portion 32. The belt structure further comprises a second ply 40 which is disposed radially inwardly of the first belt ply 31. One end 41 of the second belt ply 40 is folded radially outwardly back upon the main body portion 32 of the first belt ply 31. The width of the folded end portion 41 lies also in the range of 1/5 to ⅓ of the width of the main body portion 42. The width of the main body portion 42 is substantially equal to the width of the first belt ply 31. The folded end portion 33 extends axially outwardly beyond the edge of the main body portion 42 of the second belt ply. The reinforcement cords of the plies lie at an angle of between 15° and 35° with respect to the equatorial plane (EP) for the first belt ply and between −15° and −35° for the second belt ply. A spirally wound strip 50 is superimposed radially outwardly of the first folded belt ply 31 and extends transversely between the free edges of the folded portions 33 and 41 in substantially the same manner as described with respect to FIG. 2.

Figure 4:
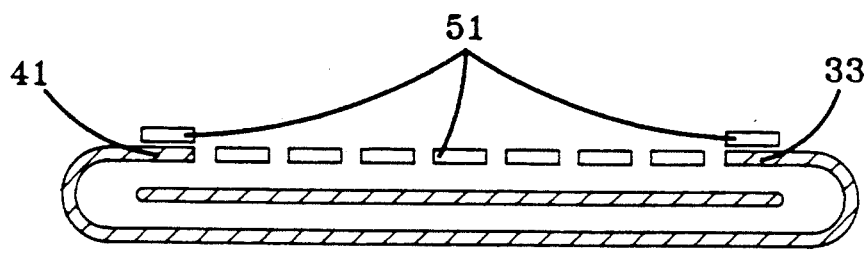

FIG. 4 illustrates an alternative to the belt structure shown in FIG. 2, wherein the spirally wound strip 51 extends radially outwardly upon the folded end portions 33 and 41 of a belt ply. In a preferred embodiment, the strip covers about ⅓ of the width of the folded end portions.

Figure 5:
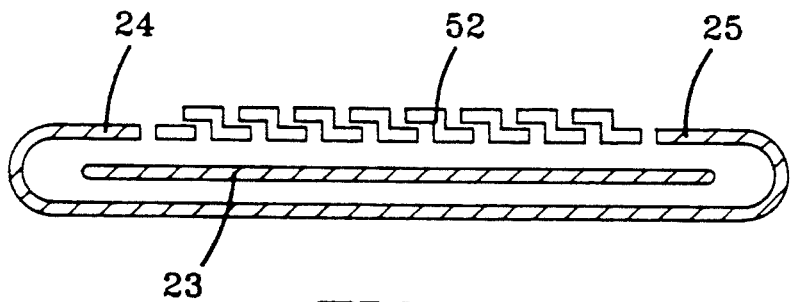
Figure 6:
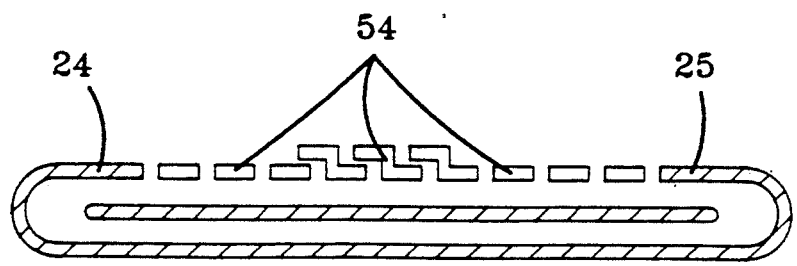
Figure 7:
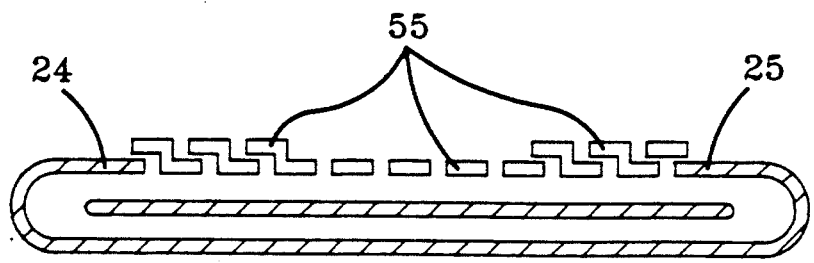

FIG. 5 illustrates an alternative to the belt structure shown in FIG. 2, wherein the spiral convolutions of the strip 52 are not in abutment with any adjacent convolutions, but adjacent convolutions have an overlapping relationship with one another. By varying the amount of overlap between adjacent convolutions, different cord densities are possible throughout the axial extent of the reinforcement zone. In one such embodiment, the spirally wound strip 54 can, for example, be in abutment near the folded back portions 24 and 25 of a belt ply and have an overlapping relationship in the region of the equatorial plane (EP) of the tire as shown on FIG. 6. In another embodiment, adjacent convolutions of the spirally wound strip 55 have an overlapping relationship in the neighborhood of the folded back portions 24 and 25 of a belt ply and are in abutment to one another in the region of the equatorial plane of the tire as shown on FIG. 7. In any case, it is preferred that such variable concentrations of reinforcement material be symmetrical with respect to the equatorial plane of the tire.

Figure 8:
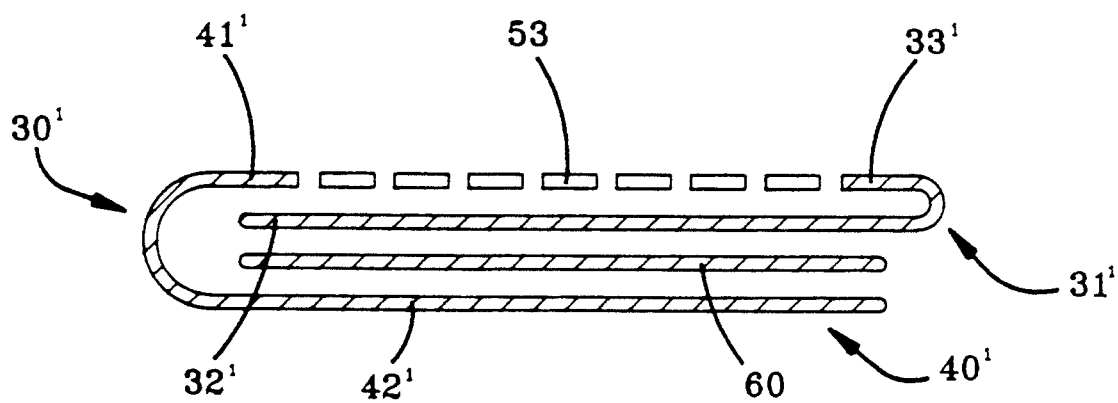

FIG. 8 illustrates an alternative to the belt structure shown in FIG. 3, further comprising an unfolded middle belt ply 60, which is placed radially outwardly with respect to the folded belt ply 40'. The width of this middle belt ply 60 is approximately equal to the width of the main body portion 42' of the second folded belt ply. Whereas the reinforcement cords of the folded plies 31' and 40' for reasons of symmetry, are made of the same material and have the same cord orientation with respect to the equatorial plane, the reinforcement cords of the middle belt ply are preferably of high modulus material and lie at an angle which is in a diagonally opposite direction, preferably at an angle between 15 and 35 with respect to the equatorial plane. A spirally wound strip 53 is superimposed radially outwardly of the folded belt ply 31'. Further details and advantages of a construction including a middle belt ply are disclosed in published patent application EP 57 656.

Figure 9:
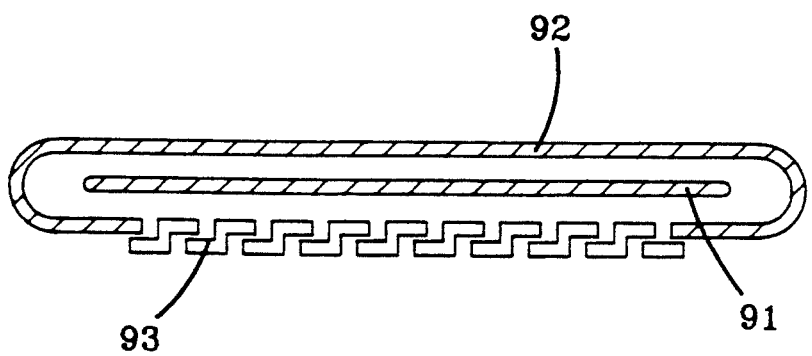

Although the invention has been described with belt structures having belt ply end portions folded radially outwardly, its teachings equally apply to belt structures where the end portions of the reinforcing belt plies have been folded radially inwardly. In FIG. 9, there is illustrated an example of an inverted belt structure: the radially outermost belt ply 92 is folded back on both lateral sides in a radially inward direction around the edges of the radially innermost belt ply 91. The spirally wound strip 93 is located between the carcass ply (not shown) and the belt ply 91 and extends outwardly below the free edges of the folded back portions of the radially outermost belt ply 92.

It will be apparent that changes may be made in the positioning of the spiral convolutions, in the extent of overlap below the free edges of the folded back portions or in the choice of the type of belt plies; the spirally wound strip could equally form a second or a third layer, superimposed on the previously wound layer(s) so as to extend at least partially across its/their width(s). The embodiments of the invention described above should be considered as illustrative and not as limiting the scope of the invention as defined in the following claims.

We claim:

1. A pneumatic tire comprising a radial ply carcass, a tread disposed radially outwardly of the crown region of the carcass, a belt assembly including at least a first belt ply and a second belt ply, interposed between the tread portion and the crown region in circumferential surrounding relation to the carcass, whereby at least one of the plies of the belt assembly has folded back portions on at least one lateral side, so that there is one folded back portion on the opposed lateral sides of the belt assembly, each of the belt plies comprising reinforcement cords extending parallel to one another in each belt ply, and the cords in the first belt ply making with the cords in the second belt ply opposed angles with respect to the equatorial plane of the tire, characterized in that a spirally wound strip, made from cord reinforced elastomeric material, is located in the proximity of the belt plies and extends at least transversely between free edges of the folded back portions, and spiral convolutions of the strip make an angle of between 0° and 5° with the tire's equatorial plane, and wherein the spiral convolutions of the spirally wound strip are in abutment with the adjacent convolutions in a region of the edges of the folded back portions and have an overlapping relationship in a region of the equatorial plane of the tire.

* * * * *